US012572777B2

(12) United States Patent
Davis et al.

(10) Patent No.: US 12,572,777 B2
(45) Date of Patent: *Mar. 10, 2026

(54) POLICY-BASED CONTROL OF MULTIMODAL MACHINE LEARNING MODEL VIA ACTIVATION ANALYSIS

(71) Applicant: HiddenLayer, Inc., Austin, TX (US)

(72) Inventors: Andrew Davis, Portland, OR (US); Amelia Kawasaki, Corvallis, OR (US)

(73) Assignee: HiddenLayer, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/811,610

(22) Filed: Aug. 21, 2024

(65) Prior Publication Data

US 2025/0356165 A1 Nov. 20, 2025

Related U.S. Application Data

(63) Continuation-in-part of application No. 18/669,366, filed on May 20, 2024.

(51) Int. Cl.
*G06N 3/0442* (2023.01)
*G06N 3/0475* (2023.01)

(52) U.S. Cl.
CPC ......... *G06N 3/0442* (2023.01); *G06N 3/0475* (2023.01)

(58) Field of Classification Search
CPC ............................ G06N 3/0442; G06N 3/0475
USPC .......................................................... 706/20
See application file for complete search history.

(56) References Cited

U.S. PATENT DOCUMENTS

| | | |
|---|---|---|
| 7,802,298 B1 | 9/2010 | Hong et al. |
| 9,350,748 B1 | 5/2016 | McClintock et al. |
| 9,356,941 B1 | 5/2016 | Kislyuk et al. |
| 9,516,053 B1 | 12/2016 | Muddu et al. |
| 10,121,104 B1 | 11/2018 | Hu et al. |
| 10,193,902 B1 | 1/2019 | Caspi et al. |
| 10,205,735 B2 | 2/2019 | Apostolopoulos |
| 10,210,036 B2 | 2/2019 | Iyer et al. |
| 10,462,168 B2 | 10/2019 | Shibahara et al. |
| 10,637,884 B2 | 4/2020 | Apple et al. |
| 10,673,880 B1 | 6/2020 | Pratt et al. |

(Continued)

FOREIGN PATENT DOCUMENTS

CN 117786750 A 3/2024

OTHER PUBLICATIONS

Morozov & Babenko, 2019, "Unsupervised Neural Quantization for Compressed-Domain Similarity Search" (Year: 2019).*

(Continued)

*Primary Examiner* — Abdullah Al Kawsar
*Assistant Examiner* — Jun Kwon
(74) *Attorney, Agent, or Firm* — Jones Day

(57) ABSTRACT

An analysis engine receives data characterizing a multimodal prompt for ingestion by a generative artificial intelligence (GenAI) model. The multimodal prompt is processed and fed into a plurality of layers from which an intermediate result of the GenAI model or a proxy of the GenAI model is obtained. The analysis engine, using a classifier and the intermediate result, determines whether the prompt elicits undesired behavior by the GenAI model. Data characterizing the determination is provided to a consuming application or process. Related apparatus, systems, techniques and articles are also described.

17 Claims, 12 Drawing Sheets

(56) References Cited

U.S. PATENT DOCUMENTS

| | | |
|---|---|---|
| 10,764,313 B1 | 9/2020 | Mushtaq |
| 10,803,188 B1 | 10/2020 | Rajput et al. |
| 10,824,721 B2 | 11/2020 | Kesarwani et al. |
| 11,310,270 B1 | 4/2022 | Weber et al. |
| 11,483,327 B2 | 10/2022 | Hen et al. |
| 11,501,101 B1 | 11/2022 | Ganesan et al. |
| 11,551,137 B1 | 1/2023 | Echauz et al. |
| 11,601,468 B2 | 3/2023 | Angel et al. |
| 11,710,045 B2 | 7/2023 | Lee et al. |
| 11,710,067 B2 | 7/2023 | Harris et al. |
| 11,762,998 B2 | 9/2023 | Kuta et al. |
| 11,777,957 B2 | 10/2023 | Chen et al. |
| 11,875,130 B1 | 1/2024 | Bosnjakovic et al. |
| 11,893,111 B2 | 2/2024 | Sai et al. |
| 11,893,358 B1 | 2/2024 | Lakshmikanthan et al. |
| 11,930,030 B1 | 3/2024 | Burns et al. |
| 11,930,039 B1 | 3/2024 | Geethakumar et al. |
| 11,954,199 B1 | 4/2024 | Burns et al. |
| 11,960,514 B1 | 4/2024 | Taylert et al. |
| 11,962,546 B1 | 4/2024 | Hattangady et al. |
| 11,971,914 B1 | 4/2024 | Watson et al. |
| 11,972,333 B1 | 4/2024 | Horesh et al. |
| 11,995,180 B1 | 5/2024 | Cappel et al. |
| 11,997,059 B1 | 5/2024 | Su et al. |
| 12,026,255 B1 | 7/2024 | Burns et al. |
| 12,105,844 B1 | 10/2024 | Burns et al. |
| 12,107,885 B1 | 10/2024 | Kawasaki et al. |
| 12,111,926 B1 | 10/2024 | Beveridge et al. |
| 12,124,592 B1 | 10/2024 | O'Hern et al. |
| 12,130,917 B1 | 10/2024 | Yeung et al. |
| 12,130,943 B1 | 10/2024 | Burns et al. |
| 12,137,118 B1 | 11/2024 | Kawasaki et al. |
| 12,174,954 B1 | 12/2024 | Yeung et al. |
| 12,182,264 B2 | 12/2024 | Sinha et al. |
| 12,197,859 B1 | 1/2025 | Malviya et al. |
| 12,204,323 B1 | 1/2025 | Malviya et al. |
| 12,229,265 B1 | 2/2025 | Yeung et al. |
| 12,248,883 B1 | 3/2025 | Rideout et al. |
| 12,293,277 B1 | 5/2025 | Yeung et al. |
| 2010/0082811 A1 | 4/2010 | Van Der Merwe |
| 2014/0033307 A1 | 1/2014 | Schmidtler |
| 2014/0157415 A1 | 6/2014 | Abercrombie et al. |
| 2015/0074392 A1 | 3/2015 | Boivie et al. |
| 2016/0344770 A1 | 11/2016 | Verma et al. |
| 2017/0154021 A1 | 6/2017 | Vidhani et al. |
| 2017/0251006 A1 | 8/2017 | LaRosa et al. |
| 2017/0331841 A1 | 11/2017 | Hu et al. |
| 2018/0018590 A1 | 1/2018 | Szeto et al. |
| 2018/0063190 A1 | 3/2018 | Wright et al. |
| 2018/0205734 A1 | 7/2018 | Wing et al. |
| 2018/0219888 A1 | 8/2018 | Apostolopoulos |
| 2018/0324193 A1 | 11/2018 | Ronen et al. |
| 2019/0050564 A1 | 2/2019 | Pogorelik et al. |
| 2019/0238568 A1* | 8/2019 | Goswami ............. G06F 21/566 |
| 2019/0238572 A1 | 8/2019 | Manadhata et al. |
| 2019/0260784 A1 | 8/2019 | Stockdale et al. |
| 2019/0311118 A1 | 10/2019 | Grafi et al. |
| 2019/0392176 A1 | 12/2019 | Taron et al. |
| 2020/0019721 A1 | 1/2020 | Shanmugam et al. |
| 2020/0076771 A1 | 3/2020 | Maier et al. |
| 2020/0092299 A1 | 3/2020 | Srinivasan et al. |
| 2020/0167471 A1 | 5/2020 | Darvish et al. |
| 2020/0175094 A1 | 6/2020 | Palmer et al. |
| 2020/0219009 A1 | 7/2020 | Dao et al. |
| 2020/0233979 A1 | 7/2020 | Maraghoosh et al. |
| 2020/0279192 A1 | 9/2020 | Godfrey et al. |
| 2020/0285737 A1 | 9/2020 | Kraus et al. |
| 2020/0313849 A1 | 10/2020 | Kar et al. |
| 2020/0364333 A1 | 11/2020 | Derks et al. |
| 2020/0403826 A1 | 12/2020 | Dawani et al. |
| 2020/0409323 A1 | 12/2020 | Spalt et al. |
| 2021/0110062 A1 | 4/2021 | Oliner et al. |
| 2021/0141897 A1 | 5/2021 | Seifert et al. |
| 2021/0209464 A1 | 7/2021 | Bala et al. |
| 2021/0218673 A1 | 7/2021 | Ma et al. |
| 2021/0224425 A1 | 7/2021 | Nasr-Azadani et al. |
| 2021/0303695 A1 | 9/2021 | Grosse et al. |
| 2021/0319098 A1 | 10/2021 | Pogorelik et al. |
| 2021/0319784 A1 | 10/2021 | Le Roux et al. |
| 2021/0357508 A1 | 11/2021 | Elovici et al. |
| 2021/0374247 A1 | 12/2021 | Sultana et al. |
| 2021/0407051 A1* | 12/2021 | Pardeshi ............... G06N 3/088 |
| 2022/0030009 A1 | 1/2022 | Hasan |
| 2022/0058444 A1 | 2/2022 | Olabiyi et al. |
| 2022/0070195 A1 | 3/2022 | Sern et al. |
| 2022/0083658 A1 | 3/2022 | Shah et al. |
| 2022/0114399 A1 | 4/2022 | Castiglione et al. |
| 2022/0147597 A1 | 5/2022 | Bhide et al. |
| 2022/0164444 A1 | 5/2022 | Prudkovskij et al. |
| 2022/0166795 A1 | 5/2022 | Simioni et al. |
| 2022/0182410 A1 | 6/2022 | Tupsamudre et al. |
| 2022/0253464 A1 | 8/2022 | Sloane et al. |
| 2022/0269796 A1 | 8/2022 | Chase et al. |
| 2022/0284283 A1 | 9/2022 | Yin et al. |
| 2022/0309179 A1 | 9/2022 | Payne et al. |
| 2023/0008037 A1 | 1/2023 | Venugopal et al. |
| 2023/0027149 A1* | 1/2023 | Kuan .................. H04L 63/1425 |
| 2023/0049479 A1* | 2/2023 | Mozo Velasco ......... G06N 3/08 |
| 2023/0109426 A1 | 4/2023 | Hashimoto et al. |
| 2023/0111744 A1 | 4/2023 | Chandrasekaran et al. |
| 2023/0128947 A1 | 4/2023 | Bhaskar et al. |
| 2023/0148116 A1 | 5/2023 | Stokes et al. |
| 2023/0169397 A1 | 6/2023 | Smith et al. |
| 2023/0185912 A1 | 6/2023 | Sinn et al. |
| 2023/0185915 A1 | 6/2023 | Rao et al. |
| 2023/0208869 A1 | 6/2023 | Bisht et al. |
| 2023/0229960 A1 | 7/2023 | Zhu et al. |
| 2023/0252178 A1 | 8/2023 | Ruelke et al. |
| 2023/0259787 A1 | 8/2023 | David et al. |
| 2023/0269263 A1 | 8/2023 | Yarabolu |
| 2023/0274003 A1 | 8/2023 | Liu et al. |
| 2023/0289604 A1 | 9/2023 | Chan et al. |
| 2023/0351143 A1 | 11/2023 | Kutt et al. |
| 2023/0359903 A1* | 11/2023 | Cefalu .................. G06F 40/279 |
| 2023/0359924 A1 | 11/2023 | Maman et al. |
| 2023/0385085 A1 | 11/2023 | Singh |
| 2023/0388324 A1 | 11/2023 | Thompson |
| 2024/0005690 A1* | 1/2024 | Brodie ................. G06V 30/413 |
| 2024/0007469 A1 | 1/2024 | Wang et al. |
| 2024/0022585 A1 | 1/2024 | Burns et al. |
| 2024/0031026 A1 | 1/2024 | Fujisawa et al. |
| 2024/0039948 A1 | 2/2024 | Koc et al. |
| 2024/0045959 A1 | 2/2024 | Marson et al. |
| 2024/0054233 A1 | 2/2024 | Ohayon et al. |
| 2024/0078337 A1 | 3/2024 | Kamyshenko et al. |
| 2024/0080333 A1 | 3/2024 | Burns et al. |
| 2024/0126611 A1 | 4/2024 | Phanishayee et al. |
| 2024/0127065 A1 | 4/2024 | Ren et al. |
| 2024/0160902 A1 | 5/2024 | Padgett et al. |
| 2024/0185086 A1* | 6/2024 | Hou ...................... G06N 3/096 |
| 2024/0289628 A1 | 8/2024 | Parmar et al. |
| 2024/0289863 A1 | 8/2024 | Smith Lewis et al. |
| 2024/0296315 A1 | 9/2024 | Singh et al. |
| 2024/0386103 A1* | 11/2024 | Clement ................. G06F 21/56 |
| 2024/0414177 A1 | 12/2024 | Lal et al. |
| 2024/0427986 A1 | 12/2024 | Shakarian et al. |
| 2025/0086455 A1 | 3/2025 | Yang et al. |

OTHER PUBLICATIONS

Elthakeb et al. "Divide and Conquer: Leveraging Intermediate Feature Representations for Quantized Training of Neural Networks", 2020 (Year: 2020).*

Shi et al., "PL-Transformer: a POS-aware and layer ensemble transformer for text classification", 2022 (Year: 2022).*

Wang et al., 2023, "Self-Deception: Reverse Penetrating the Semantic Firewall of Large Language Models," arXiv:2308.11521v1 [cs. CL] Aug. 16, 2023 (15 pages).

Shayegani et al., 2023, "Survey of Vulnerabilities in Large Language Models Revealed by Adversarial Attacks," arXiv:2310. 10844v1 [cs.CL] Oct. 16, 2023 (54 pages).

Bezymiannyi et al., 2023, "Filter for confidential information," Electronics and Control Systems 4(78):21-25 (5 pages).

(56)        References Cited

OTHER PUBLICATIONS

Wang et al., 2023, "Self-Guard: Empower the LLM to Safeguard Itself," ACL Anthology, NAACL (21 pages).

Kim et al., 2023, "Robust Safety Classifier for Large Language Models: Adversarial Prompt Shield," Available online at: https://arxiv.org/abs/2311.00172 (11 pages).

Kim et al., 2023, "Memory-Efficient Fine-Tuning of Compressed Large Language Models via sub-4-bit Integer," Available online at https://arxiv.org/abs/2305.14152 (21 pages).

Zhou et al., 2024, "A Survey on Efficient Inference for Large Language Models," Available online at https://arxiv.org/abs/2404.14294 (36 pages).

International Search Report and Written Opinion mailed Jun. 25, 2025 for PCT/US2025/026109 filed Apr. 24, 2025 (11 pages).

Automorphic.ai, 2024, "Github—automorphic-ai/aegis: Self-hardening firewall for large language models," XP093278213, Available online at https://web.archive.org/web/20240222171700/https://github.com/automorphic-ai/aegis (2 pages).

Sun et al., "Conscendi: A Contrastive and Scenario-Guided Distillation Approach to Guardrail Models for Virtual Assistants," arXiv:2304.14364v1 [cs.CL] Apr. 27, 2023 (20 pages).

Hu et al., "Gradient Cuff: Detecting Jailbreak Attacks on Large Language Models by Exploring Refusal Loss Landscapes," arXiv:2403.00867v1 [cs.CR] Mar. 1, 2024 (19 pages).

Robey et al., "SmoothLLM: Defending Large Language Models Against Jailbreaking Attacks," arXiv:2310.03684v3 [cs.LG] Nov. 29, 2023 (42 pages).

Mohtashami et al., "Social Learning: Towards Collaborative Learning with Large Language Models," arXiv:2312.11441v2 [cs.LG] Feb. 8, 2024 (19 pages).

Chao et al., 2023, "Jailbreaking black box large language models in twenty queries," University of Pennsylvania, Available online at: https://arxiv.org/abs/2211.09527 (21 pages).

Goodfellow et al., 2015, "Explaining and harnessing adversarial examples," 3rd International Conference on Learning Representations, ICLR 2015, Available online at: http://arxiv.org/abs/1412.6572 (11 pages).

Hu et al., 2022, "LoRA: Low-rank adaptation of large language models," International Conference on Learning Representations, Available online at: https://openreview.net/forum?id=nZeVKeeFYf9 (13 pages).

Imoxto, 2024, "prompt injection cleaned dataset-v2," Hugging Face, available online at: https://huggingface.co/datasets/imoxto/prompt_injection_cleaned_datasetv2 (3 pages).

Jiang et al., 2023, "Mistral 7b," Available online at: https://mistral.ai/news/announcing-mistral-7b (9 pages).

Ke et al., 2017, "Lightgbm: a highly efficient gradient boosting decision tree," Proceedings of the 31st International Conference on Neural Information Processing Systems (9 pages).

Lee et al., 2023, "Wizardvicunalm," Available online at: https://github.com/melodysdreamj/WizardVicunaLM (6 pages).

Lee, 2023, "ChatGPT DAN," ChatGPT DAN, Jailbreaks prompt, Available online at: https://github.com/0xk1h0/ChatGPT_DAN (3 pages).

Lian et al., 2023. "Openorca: An open dataset of gpt augmented flan reasoning traces," Hugging Face, Available online at: https://huggingface.co/Open-Orca/OpenOrca (8 pages).

Luo et al., 2024, "Jailbreakv-28k: A benchmark for assessing the robustness of multimodal large language models against jailbreak attacks," Available online at: https://arxiv.org/abs/2404.03027 (20 pages).

MacDiarmid et al., 2024, "Simple probes can catch sleeper agents," Available online at: https://www.anthropic.com/news/probescatch-sleeper-agents (18 pages).

Perez et al., 2022, "Ignore previous prompt: Attack techniques for language models," NeurIPS ML Safety Workshop, 36th Conference on Neural Information Processing System (NeurIPS2022), Available online at: https://openreview.net/forum?id=giaRo_7Zmug (21 pages).

Raman et al., 2023, "Model-tuning via prompts makes NLP models adversarially robust," The 2023 Conference on Empirical Methods in Natural Language Processing, Available online at: https://openreview.net/forum?id=R4yb4m7Nus (21 pages).

Schulhoff et al., 2023, "Ignore this title and hackAPrompt: Exposing systemic vulnerabilities of LLMs through a global prompt hacking competition," The 2023 Conference on Empirical Methods in Natural Language Processing, Available online at: https://openreview.net/forum?id=hcDE6sOEfu (33 pages).

Sujet-Ai, 2024, "Sujet finance dataset," Huging Face, https://huggingface.co/datasets/sujetai/Sujet-Finance-Instruct-177k (6 pages).

Templeton et al., 2024, "Scaling monosemanticity: Extracting interpretable features from claude 3 sonnet," Transformer Circuits Thread, Available online at: https://transformer-circuits.pub/2024/scalingmonosemanticity/index.html (75 pages).

Touvron et al., 2023, "Llama 2: Open foundation and fine-tuned chat models," Available online at: https://arxiv.org/abs/2307.09288 (77 pages).

Zhang et al., 2024, "Tinyllama: An open-source small language model," Available online at: https://arxiv.org/abs/2401.02385 (10 pages).

Zheng et al., 2023, "Judging LLM-as-a-judge with MT-bench and chatbot arena," Thirty-seventh Conference on Neural Information Processing Systems Datasets and Benchmarks Track, Available online at: https://openreview.net/forum?id=uccHPGDlao (29 pages).

Zou et al., 2023, "Representation engineering: A top-down approach to ai transparency," Available online at: https://arxiv.org/abs/2310.01405 (55 pages).

Zou et al., 2023, "Universal and transferable adversarial attacks on aligned language models," Available online at: https://arxiv.org/abs/2307.15043 (31 pages).

Morozov et al., 2019, "Unsupervised Neural Quantization for Compressed-Domain Similarity Search," International Conference on Computer Vision (ICCV) 2019 (11 pages).

Rijthoven et al., 2021, "HookNet: Multi-resolution convulational neural networks for semantic segmentation in histopathology whole-slide images," Medical Imange Analysis 68:1-10.

Dinan et al., 2021, "Anticipating safety issues in e2e conversational ai: Framework and tooling," arXiv preprint arXiv:2107.03451v3 (43 pages).

Abadi et al., 2016, "Deep Learning with Differential Privacy," arXiv:1607.00133v2 [stat.ML] Oct. 24, 2016 (14 pages).

Carlini et al., 2021, "Extracting Training Data from Large Language Models," arXiv:2012.07805v2 [cs.CR] Jun. 15, 2021 (19 pages).

Choquette-Choo et al., 2021, "Label-Only Membership Inference Attacks," arXiv:2007.14321v3 [cs.CR] Dec. 5, 2021 (17 pages).

Heusel et al., 2018, "GANs Trained by a Two Time-Scale Update Rule Converge to a Local Nash Equilibrium," arXiv:1706.08500v6 [cs.LG] Jan. 12, 2018 (38 pages).

Hu et al., 2021, "LoRA: Low-rank adaptation of large language models," arXiv:2106.09685v2 [cs.CL] Oct. 16, 2021 (26 pages).

Kahla et al., 2022, "Label-Only Model Inversion Attacks via Boundary Repulsion," arXiv:2203.01925v1 [cs.LG] Mar. 3, 2022 (13 pages).

Ko et al., 2023, "PrivMon: A Stream-Based System for Real-Time Privacy Attack Detection for Machine Learning Models," Raid 2023 https://doi.org/10.1145/3607199.3607232 (18 pages).

Li et al., 2021, "Membership Leakage in Label-Only Exposures," arXiv:2007.15528v3 [cs.LG] Sep. 17, 2021 (17 pages).

Li et al., 2022, "Blacklight: Scalable Defense for Neural Networks against Query-Based Black-Box Attacks," Proceedings of the 31st Usenix Security Symposium (19 pages).

Liu et al., 2015, "Deep Learning Face Attributes in the Wild," arXiv:1411.7766v3 [cs.CV] Sep. 24, 2015 (11 pages).

Madry et al., 2019, "Towards Deep Learning Models Resistant to Adversarial Attacks," arXiv:1706.06083v4 [stat.ML] Sep. 4, 2019 (28 pages).

Mattern et al., 2023, "Membership Inference Attacks against Language Models via Neighborhood Comparison," arXiv:2305.18462v2 [cs.CL] Aug. 7, 2023 (12 pages).

Mireshghallah et al., 2022, "Quantifying Privacy Risks of Masked Language Models Using Membership Inference Attacks," arXiv:2203.03929v2 [cs.LG] Nov. 4, 2022 (16 pages).

(56)  References Cited

OTHER PUBLICATIONS

Salimans et al., 2016, "Improved Techniques for Training GANs," arXiv:1606.03498v1 [cs.LG] Jun. 10, 2016 (10 pages).
Zhang et al., 2020, "The Secret Revealer: Generative Model-Inversion Attacks Against Deep Neural Networks," https://arxiv.org/abs/1911.07135 (9 pages).

* cited by examiner

800

900

CLIENT
DEVICE
110

CLIENT
DEVICE
110

CLIENT
DEVICE
110

CLASSIFIER
194

PROXY
150

ANALYSIS
ENGINE
152

REMEDIATION
ENGINE
154

MLA
130

MODEL ENVIRONMENT
140

1000

1200

RECEIVE MULTIMIODAL PROMPT FOR INGESTION BY GENAI MODEL — 1210

CAPTURE INTERMEDIATE RESULT OF GENAI MODEL — 1220

DETERMINE, USING CLASSIFIER AND INTERMEDIATE RESULT, WHETHER PROMPT ELICITS UNDESIRED MODEL BEHAVIOR — 1230

PROVIDE DATA CHARACTERIZING DETERMINATION TO CONSUMING APPLICATION OR PROCESS — 1240

POLICY-BASED CONTROL OF MULTIMODAL MACHINE LEARNING MODEL VIA ACTIVATION ANALYSIS

RELATED APPLICATION

This application claims priority to U.S. patent application Ser. No. 18/669,366 filed on May 20, 2024, the contents of which are hereby fully incorporated by reference.

TECHNICAL FIELD

The subject matter described herein relates to techniques for monitoring artificial intelligence (AI) models, such as large language models, using policies in combination an intermediate result of the AI model to prevent undesired model behavior in connection with multimodal input.

BACKGROUND

Machine learning (ML) algorithms and models, such as large language models, ingest large amounts of data and use pattern recognition and other techniques to make predictions and adjustments based on that data. These models have attack surfaces that can be vulnerable to cyberattacks in which adversaries attempt to manipulate or modify model behavior to cause such model to behave in an undesired manner. These attacks can act to corrupt input data so as to make outputs unreliable or incorrect. By modifying or otherwise manipulating the input of a model, a malicious actor can modify an output of an application or process for malicious purposes including bypassing security measures resulting in data leakage, unauthorized system access, and the solicitation of unlawful or otherwise restricted information.

SUMMARY

In a first aspect, data is received which characterizes a prompt for ingestion by a generative artificial intelligence (GenAI) model. An intermediate result generated by the GenAI model using the received data can be captured. It is then determined, based on the intermediate result and using a classifier, whether the prompt seeks to cause the GenAI model to behave in an undesired manner. Data which characterizes this determination can be provided to a consuming application or process.

The classifier can be trained using a data set generated using a policy mapping intermediate results to undesired model behavior. A policy can also be used to map intermediate results to one or more prohibited actions. These prohibited actions can take varying forms including seeking one or more of: a response in a non-approved spoken or written language, computer code, sensitive information, a response to an encrypted prompt, a prompt containing two or modalities, or a prompt in a first modality obfuscating information in a second modality.

The GenAI model can include a plurality of transformer layers and the intermediate result can include activations in residual streams generated by one or more of the transformer layers.

The GenAI model can be a mixture of experts (MoE) model and, in such variations, the intermediate result can include outputs from at least a subset of experts in the MoE model.

The consuming application or process can take various actions based on the provided data. For example, the consuming application or process can flag the prompt based on the determination (to help with quality assurance and the like). The consuming application or process can block an internet protocol (IP) address of a requester of the prompt based on the determination. The consuming application or process can cause subsequent prompts from an internet protocol (IP) address of a requester of the prompt to be modified based on the determination and can cause the modified prompt to be ingested by the GenAI model.

In some variations, the intermediate result is captured by a proxy of the GenAI model. With such an arrangement (i.e., an environment in which there is a proxy of the GenAI model), the consuming application or process can take various actions including preventing the prompt from being input into the GenAI model based on the determination. The consuming application or process can allow the prompt to be input into the GenAI model based on the determination. The consuming application or process can modify the prompt based on the determination and can cause the modified prompt to be ingested by the GenAI model. The proxy can be a quantized version of the GenAI model. In addition or alternatively, the GenAI model can be quantized (prior to capturing the intermediate result).

A policy maps intermediate results to one or more prohibited actions.

One technique for capturing the intermediate result can be by configuring the GenAI model to have hooks applied to some or all of the layers. With this arrangement, the capturing includes querying the hooks to obtain activation values as the received data is ingested by the GenAI model. These activation values can form some or all of the intermediate result.

The GenAI model can take varying forms including a state-based text analysis model such as, for example, a large language model and/or a long short-term memory model (LSTM).

The subject matter described herein provides many technical advantages. For example, the current subject matter can be used to identify and stop artificial intelligence models including large language models from behaving in an undesired manner.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
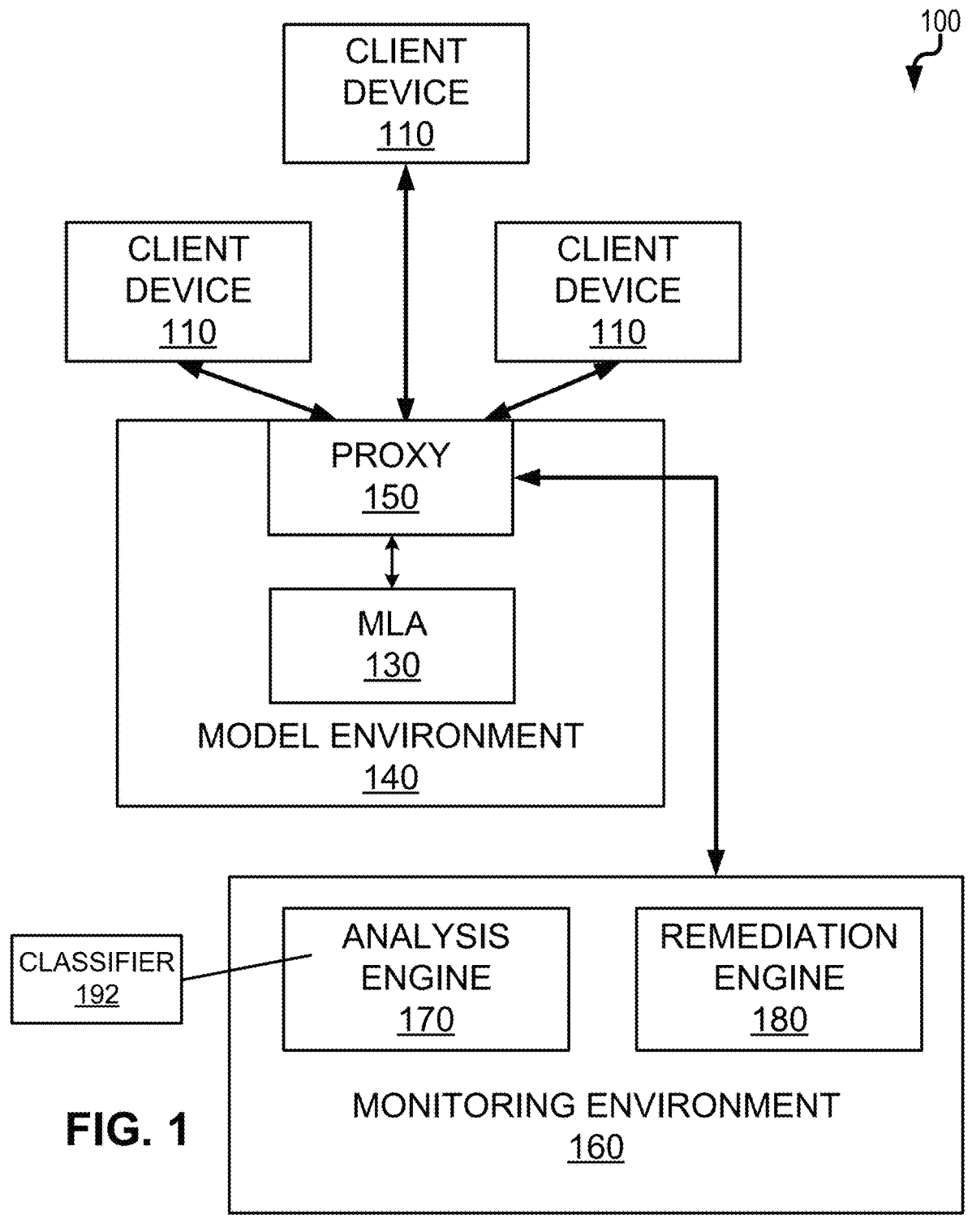
FIG. 1 is a system diagram illustrating a security platform for machine learning model architectures having a monitoring environment including an analysis engine and remediation engine.

The current subject matter is directed to advanced techniques for identifying and preventing cyberattacks on advanced artificial intelligence (AI) models including large language models (LLMs). In particular, the current subject matter is directed to analyzing prompts to determine, using machine learning, whether the prompts are eliciting the model to behave in an undesired manner. An intermediate result from one or more machine learning models is analyzed using a classifier to determine whether the intermediate result indicates that the prompt is eliciting undesired model actions. With these determinations, remediation actions can be taken in connection with the prompt including blocking the prompt, modifying the prompt, disconnecting the requesting device, disconnecting the account, and the like. The classifier can be trained using a dataset generated using a policy which maps intermediate results to acceptable/undesired behavior. In some cases, the policy can specify which remedial action to take for a particular intermediate result or type of intermediate result.

LLMs are increasingly being productionized in a variety of ways. From customer service chatbots to programming assistants, LLMs are automating away tedious work that previously only humans could reliably do. However, not every deployed LLM will require the same capabilities, and in fact these capabilities can increase attack surface area that a malicious party can then exploit. For example, a recently introduced "Product Q&A" feature on an e-commerce site, intended to be used by a shopper to ask questions and get responses based on the product description and customer reviews, was able to output malware source code when asked. This undesired result is due to there not being a clear policy on what the LLM should and should not be able to do. This current subject matter is advantageous in that it gives end-users who have deployed an LLM fine-grained control on what the LLM should and should not be able to do in its capacity of its deployment using a classifier trained using a policy-driven dataset.

The current subject matter can be applied to multimodal LLMs which integrate and analyze different types of data inputs (i.e., a prompt can contain multiple modalities)—text, images, audio, and sometimes video—to generate comprehensive and contextually aware outputs. Such a model can combine information from multiple modalities to provide richer, more accurate outputs. For instance, a multimodal model can caption images, answer questions about visual content, or generate textual descriptions of audio inputs.

Multimodal models can be particularly helpful in industries such as (i) healthcare by analyzing medical images along with patient records to assist in diagnosis, (ii) legal by interpreting and generating documents that include both textual and graphical elements such as patents, (iii) customer service by understanding and responding to customer inquiries that include screenshots or voice recordings, and (iv) creative industries by generating multimedia content such as illustrated stories or videos with narrations.

FIG. 1 is a diagram 100 in which each of a plurality of client devices 110 (e.g., an endpoint computing device, a server, etc.) can query, over one or more networks, a machine learning model architecture (MLA) 130 forming part of a model environment 140. These queries can include or otherwise characterize various information including prompts (i.e., alphanumeric strings), videos, audio, images or other files. The model environment 140 can include one or more servers and data stores to execute the MLA 130 and process and respond to queries from the client devices 110. The MLA 130 can comprise or otherwise execute one or more GenAI models utilizing one or more of natural language processing, computer vision, and machine learning. Intermediate the MLA 130 and the client devices 110 is a proxy 150 which can analyze, intercept and/or modify inputs and/or outputs of the MLA 130. In some cases, the MLA 130 can be a multimodal model that accepts multiple mode (i.e., two or more of audio, video, text, images, etc.) input/prompts. In such cases, there can be one or more preprocessing encoders which take the input and encode it so that it can be analyzed by different components forming part of a pipeline of the MLA 130. For example, the preprocessing encoders can convert any non-text content into textual format (which may be additive to text forming part of the prompt) to result in a preprocessed prompt which then can be analyzed by model (e.g., an LLM, etc.) forming part of the MLA 130 pipeline.

The proxy 150 can communicate, over one or more networks, with a monitoring environment 160. The monitoring environment 160 can include one or more servers and data stores to execute an analysis engine 170. The analysis engine 170 can execute one or more of the algorithms/models described below with regard to the protection of the MLA 130.

The proxy 150 can, in some variations, relay received queries (i.e., prompts) to the monitoring environment 160 prior to ingestion by the MLA 130. In some variations, the proxy 150 can relay intermediate results generated by the MLA 130 to the monitoring environment 160. Intermediate results, in this context, can include values generated by the MLA 130 prior to the ultimate output of the MLA 130 as will be described in more detail below. The proxy 150 can also or alternatively relay information which characterizes the received queries (e.g., excerpts, extracted features, metadata, etc.) to the monitoring environment 160 prior to ingestion by the MLA 130.

Figure 2:
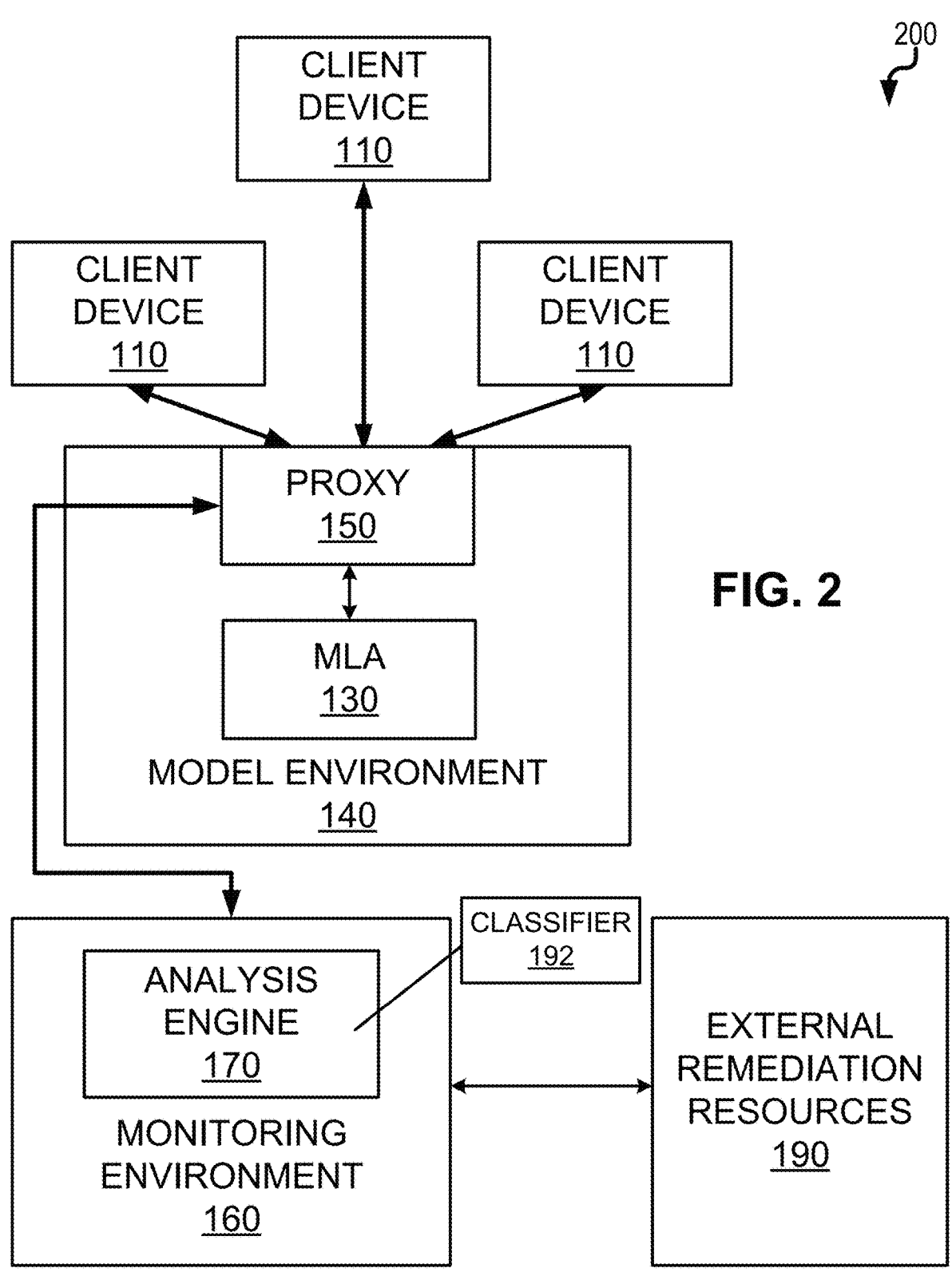
FIG. 2 is a system diagram illustrating a security platform for machine learning model architectures having a monitoring environment including an analysis engine which interfaces with external remediation resources.

The analysis engine 170 can analyze the relayed queries and/or information in order to make an assessment or other determination as to whether the queries are indicative of being malicious. In some cases, a remediation engine 180 which can form part of the monitoring environment 160 (or be external such as illustrated in FIG. 2) can take one or more remediation actions in response to a determination of a query as being malicious. These remediation actions can take various forms including transmitting data to the proxy 150 which causes the query to be blocked before ingestion by the MLA 130. In some cases, the remediation engine 180 can cause data to be transmitted to the proxy 150 which causes the query to be modified in order to be non-malicious, to remove sensitive information, and the like. Such queries, after modification, can be ingested by the MLA 130 and the output provided to the requesting client device 110. Alternatively, the output of the MLA 130 (after query modification) can be subject to further analysis by the analysis engine 170. In some cases, the analysis engine 170 can utilize a classifier 192 which can be used to identify prompts that are eliciting undesired behavior by the MLA 130. In some cases, the classifier 192 can specify a type of remediation action to take for certain types of undesired model behavior. The classifier 192 can take varying forms including, for example, one or more of a random forest model, a linear regression model, a zero-shot learning model, etc. The classifier 192 can be trained according to a policy which defines the types of actions which are deemed to constitute undesired model behavior. In some cases, the training data set uses the policy to map prompts to undesired model behaviors (to generate labeled exemplars for the training data). In other cases (and as will be described in further detail below), the classifier 192 can be trained using the policy in combination with intermediate results generated by the MLA 130 or similar model architecture.

The proxy 150 can, in some variations, relay outputs of the MLA to the monitoring environment 160 prior to transmission to the respective client device 110. The proxy 150 can also or alternatively relay information which characterizes the outputs (e.g., excerpts, extracted features, metadata, etc.) to the monitoring environment 160 prior to transmission to the respective client device 110.

The analysis engine 170 can analyze the relayed outputs and/or information from the MLA 130 in order to make an assessment or other determination as to whether the queries are indicative of being malicious (based on the output alone or based on combination of the input and the output). In some cases, the remediation engine 180 can, similar to the actions when the query analysis above, take one or more remediation actions in response to a determination of a query as being malicious. These remediation actions can take various forms including transmitting data to the proxy 150 which causes the output of the MLA 130 to be blocked prior to transmission to the requesting client device 110. In some cases, the remediation engine 180 can cause data to be transmitted to the proxy 150 which causes the output for transmission to the requesting client device 110 to be modified in order to be non-malicious, to remove sensitive information, and the like.

FIG. 2 is a diagram 200 in which each of a plurality of client devices 110 (e.g., an endpoint computing device, a server, etc.) can query, over one or more networks, a machine learning model architecture (MLA) 130 forming part of a model environment 140. These queries can include or otherwise characterize various information including prompts (i.e., alphanumeric strings), videos, audio, images or other files. The model environment 140 can include one or more servers and data stores to execute the MLA 130 and process and respond to queries from the client devices 110. The MLA 130 can comprise or otherwise execute one or more GenAI models utilizing one or more of natural language processing, computer vision, and machine learning. Intermediate the MLA 130 and the client devices 110 is a proxy 150 which can analyze, intercept and/or modify inputs and/or outputs of the MLA 130.

FIG. 2 is a system diagram 200 illustrating a security platform for machine learning model architectures having a configuration in which the monitoring environment 160 includes an analysis engine 170 which interfaces with external remediation resources 190. In this variation, the monitoring environment 160 does not include a remediation engine 180 but rather communicates, via one or more networks, with external remediation resources 190. The external remediation resources 190 can be computing devices or processes which result in actions such as blocking future requests at the network or user level and/or initiating a remediation action which closes off the impacted system until the malicious action which was output is considered ineffective.

Figure 3:
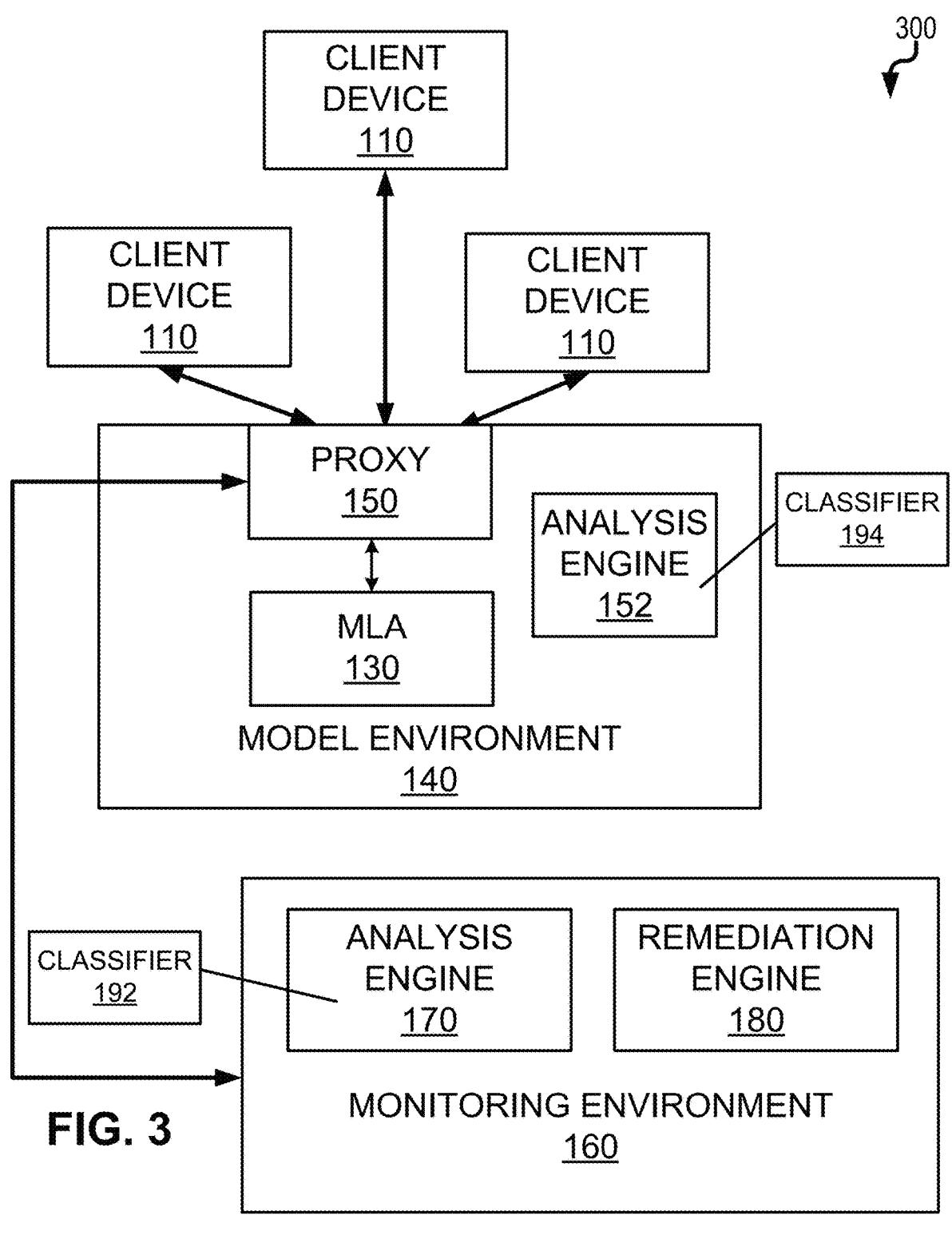
FIG. 3 is a system diagram illustrating a security platform for machine learning model architectures having a model environment having a local analysis engine and a monitoring environment including an analysis engine and a remediation engine.

FIG. 3 is a system diagram 300 illustrating a security platform for machine learning model architectures having a configuration in which the model environment 140 includes a local analysis engine 152 and the monitoring environment 160 includes both an analysis engine 170 and a remediation engine 180. In some cases, one or more of the analysis engine 152 and the remediation engine 180 can be encapsulated or otherwise within the proxy 150. In this arrangement, the local analysis engine 152 can analyze inputs and/or outputs of the MLA 130 in order to determine, for example, whether to pass on such inputs and/or outputs to the monitoring environment 160 for further analysis. For example, the local analysis engine 152 can provide a more computationally efficient local screening of inputs and/or outputs using various techniques as provided herein and optionally, using more lightweight models. If the analysis engine 152 determines that an input or output of the MLA requires further analysis, the input or output (or features characterizing same) are passed to the monitoring environment 160 which can, for example, execute more computationally expensive models (e.g., an ensemble of models, etc.) using the analysis engine 170. In some cases, the analysis engine 52 can utilize a classifier 194 which can be used to identify prompts that are eliciting undesired behavior by the MLA 130. In some cases, the classifier 194 can specify a type of remediation action to take for certain types of undesired model behavior. The classifier 194 can take varying forms including, for example, one or more of a random forest model, a linear regression model, a zero-shot learning model, etc. The classifier 194 can be trained according to a policy which defines the types of actions which are deemed to constitute undesired model behavior. In some cases, the training data set uses the policy to map prompts to undesired model behaviors (to generate labeled exemplars for the training data). In other cases (and as will be described in further detail below), the classifier 194 can be trained using the policy in combination with intermediate results generated by the MLA 130 or similar model architecture.

Figure 4:
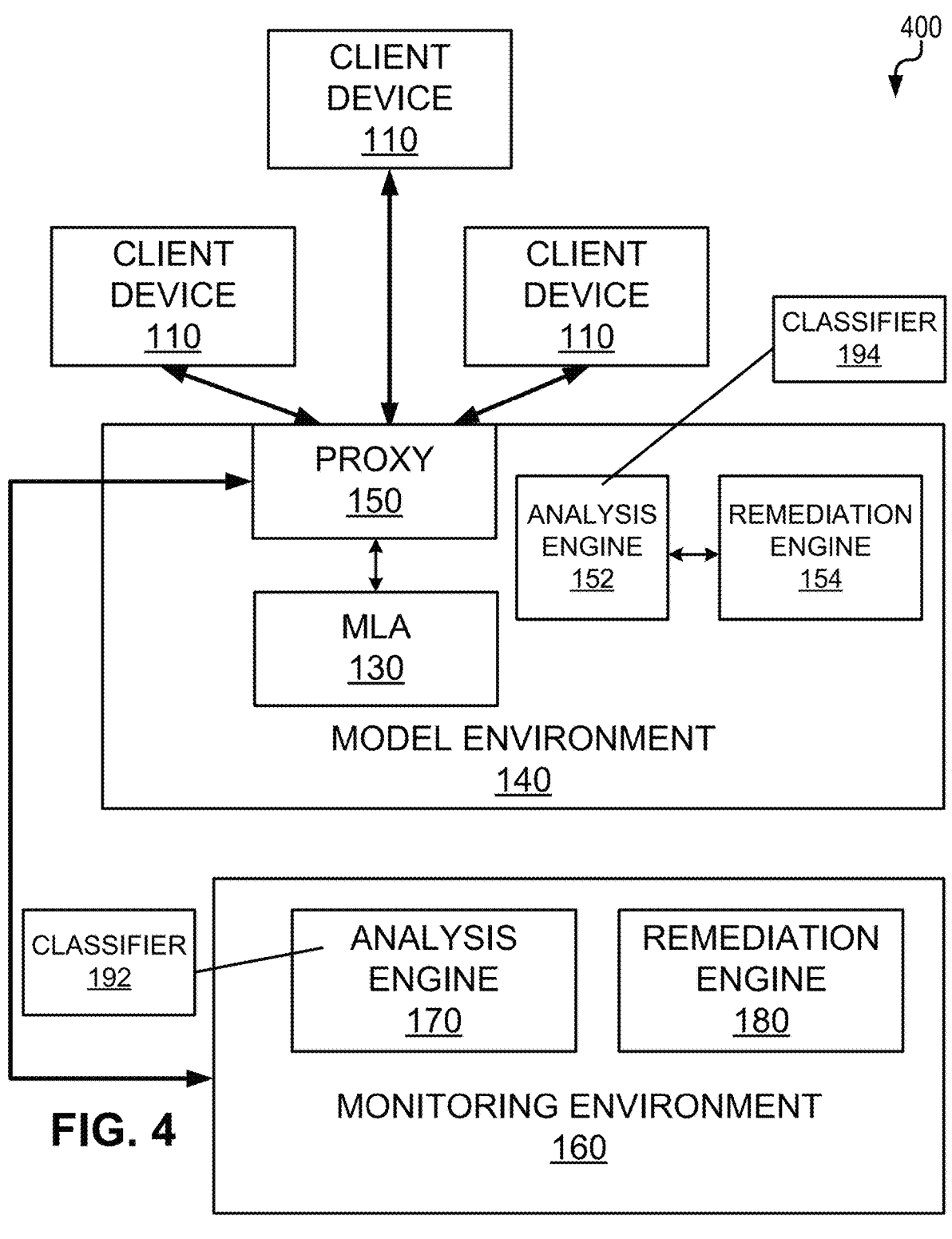
FIG. 4 is a system diagram illustrating a security platform for machine learning model architectures having a model environment having a local analysis engine and a local remediation engine and a monitoring environment including an analysis engine and a remediation engine.

FIG. 4 is a system diagram 400 illustrating a security platform for machine learning model architectures having a configuration in which the model environment includes both a local analysis engine 152 and a local remediation engine 154. The monitoring environment 160, in this variation, can include an analysis engine 170 and a remediation engine 180. In this arrangement, the local analysis engine 152 can analyze inputs and/or outputs of the MLA 130 in order to determine, for example, whether to pass on such inputs and/or outputs to local remediation engine 154 to take an affirmative remedial action such as blocking or modifying such inputs or outputs. In some cases, the local analysis engine 152 can make a determination to bypass the local remediation engine 154 and send data characterizing an input or output of the MLA 130 to the monitoring environment 160 for further actions (e.g., analysis and/or remediation, etc.). The local remediation engine 154 can, for example, handle simpler (i.e., less computationally expensive) actions while, in some cases, the remediation engine 180 forming part of the monitoring environment 160 can handle more complex (i.e., more computationally expensive) actions.

Figure 5:
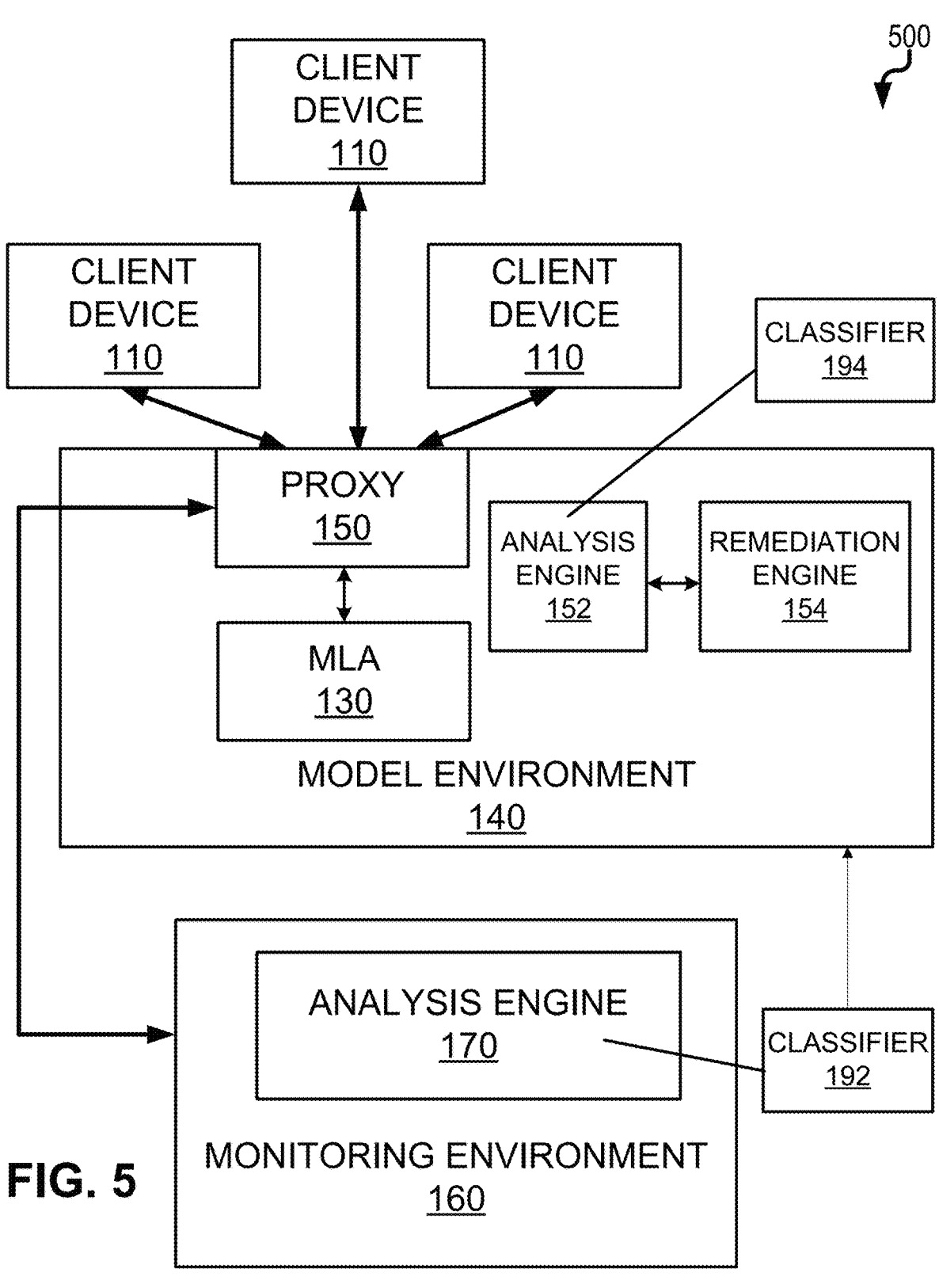
FIG. 5 is a system diagram illustrating a security platform for machine learning model architectures having a model environment having a local analysis engine and a local remediation engine and a monitoring environment including an analysis engine.

FIG. 5 is a system diagram 500 illustrating a security platform for machine learning model architectures in which the model environment 140 includes a local analysis engine 152 and a local remediation engine 154 and the monitoring environment 160 includes an analysis engine 170 (but does not include a remediation engine). With such an arrangement, any remediation activities occur within or are triggered by the local remediation engine 154 in the model environment 140. These activities can be initiated by the local analysis engine 152 and/or the analysis engine 170 forming part of the monitoring environment. In the latter scenario, a determination by the analysis engine 170 results in data (e.g., instructions, scores, etc.) being sent to the model environment 140 which results in remediation actions. In some variations, the analysis engine 152 can analyze intermediate results generated by the MLA 130. The intermediate results, in some implementations, can be analyzed using a local classifier 194.

Figure 6:
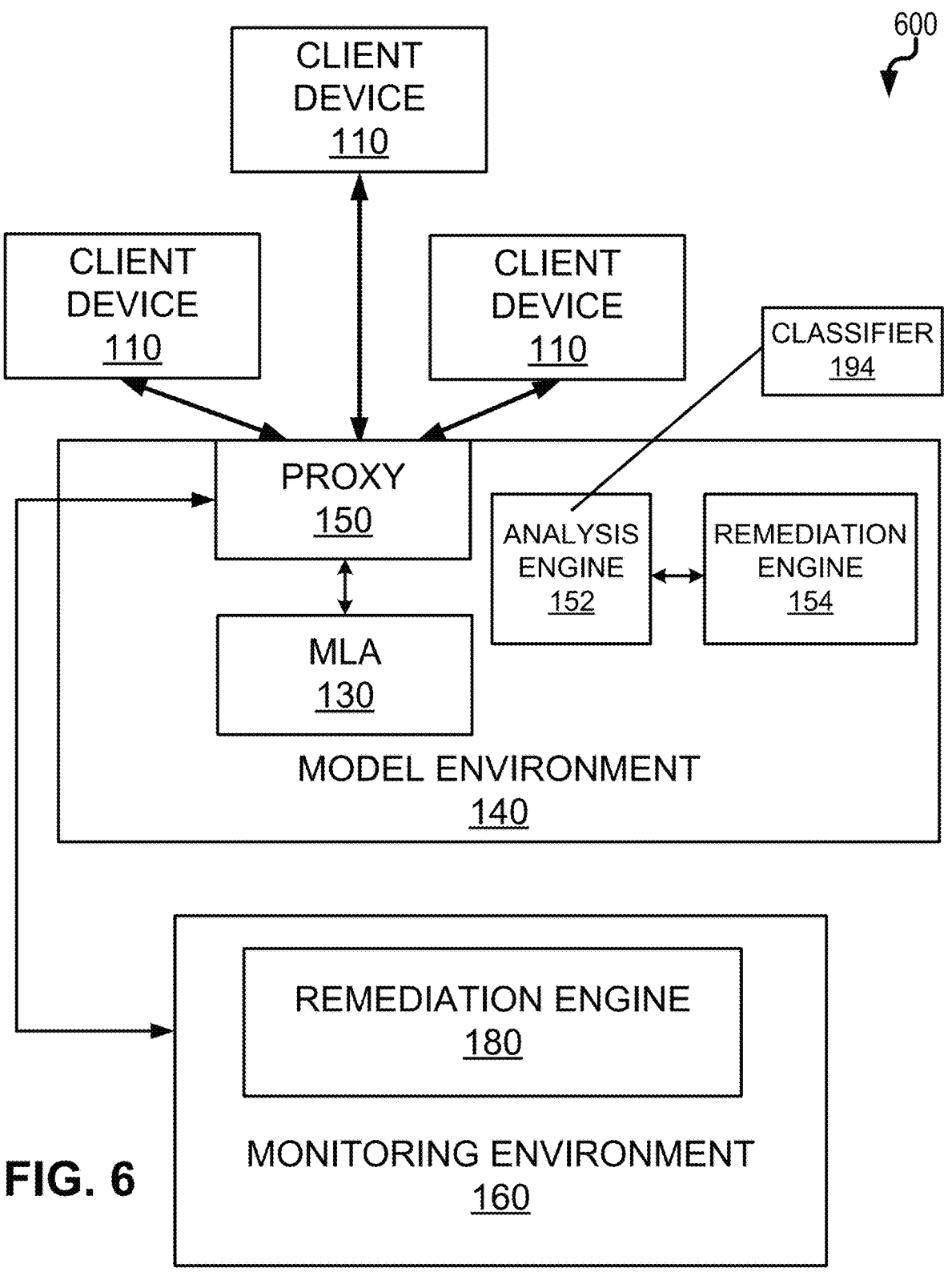
FIG. 6 is a system diagram illustrating a security platform for machine learning model architectures having a model environment having a local analysis engine and a local remediation engine and a monitoring environment including a remediation engine.

FIG. 6 is a system diagram 600 illustrating a security platform 600 for machine learning model architectures in which the model environment 140 includes a local analysis engine 152 and a local remediation engine 154 and the monitoring environment 160 includes a remediation engine 180 (but not an analysis engine). With this arrangement, analysis of inputs or outputs is performed in the model environment by the local analysis engine 152. In some cases, remediation can be initiated or otherwise triggered by the local remediation engine 154 while, in other scenarios, the model environment 140 sends data (e.g., instructions, scores, etc.) to the monitoring environment 160 so that the remediation engine 180 can initiate one or more remedial actions.

Figure 7:
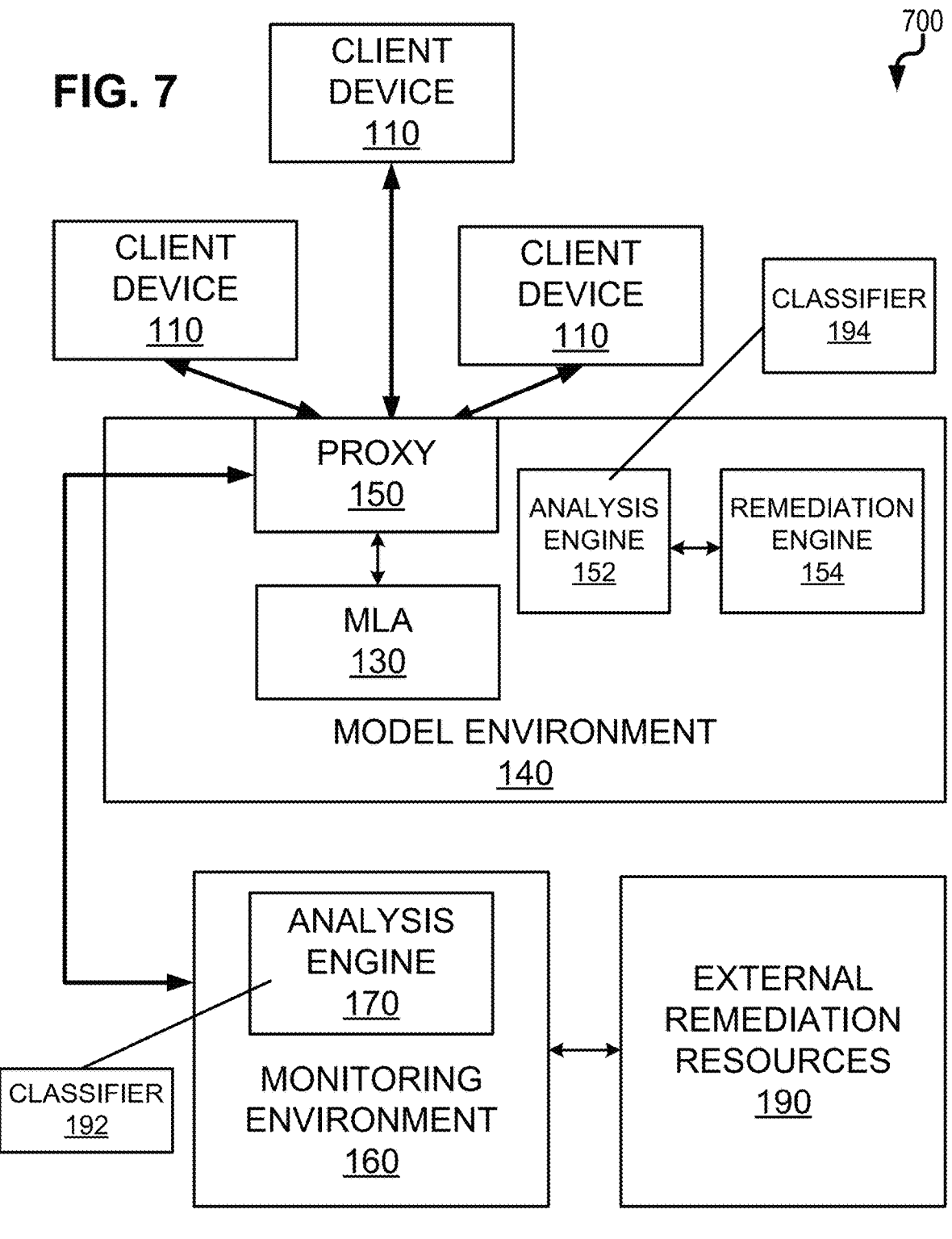
FIG. 7 is a system diagram illustrating a security platform for machine learning model architectures having a model environment having a local analysis engine and a local remediation engine and a monitoring environment including an analysis engine which interfaces with external remediation resources.

FIG. 7 is a system diagram 700 illustrating a security platform for machine learning model architectures in which the model environment 140 has a local analysis engine 152 and a local remediation engine 154 while the monitoring environment 160 includes an analysis engine 170 which interfaces with external remediation resources 190. With this arrangement, remediation can be initiated or otherwise triggered by the local remediation engine 154 and/or the external remediation resources 190. With the latter scenario, the monitoring environment 160 can send data (e.g., instructions, scores, etc.) to the external remediation resources 190 which can initiate or trigger the remediation actions.

Figure 8:
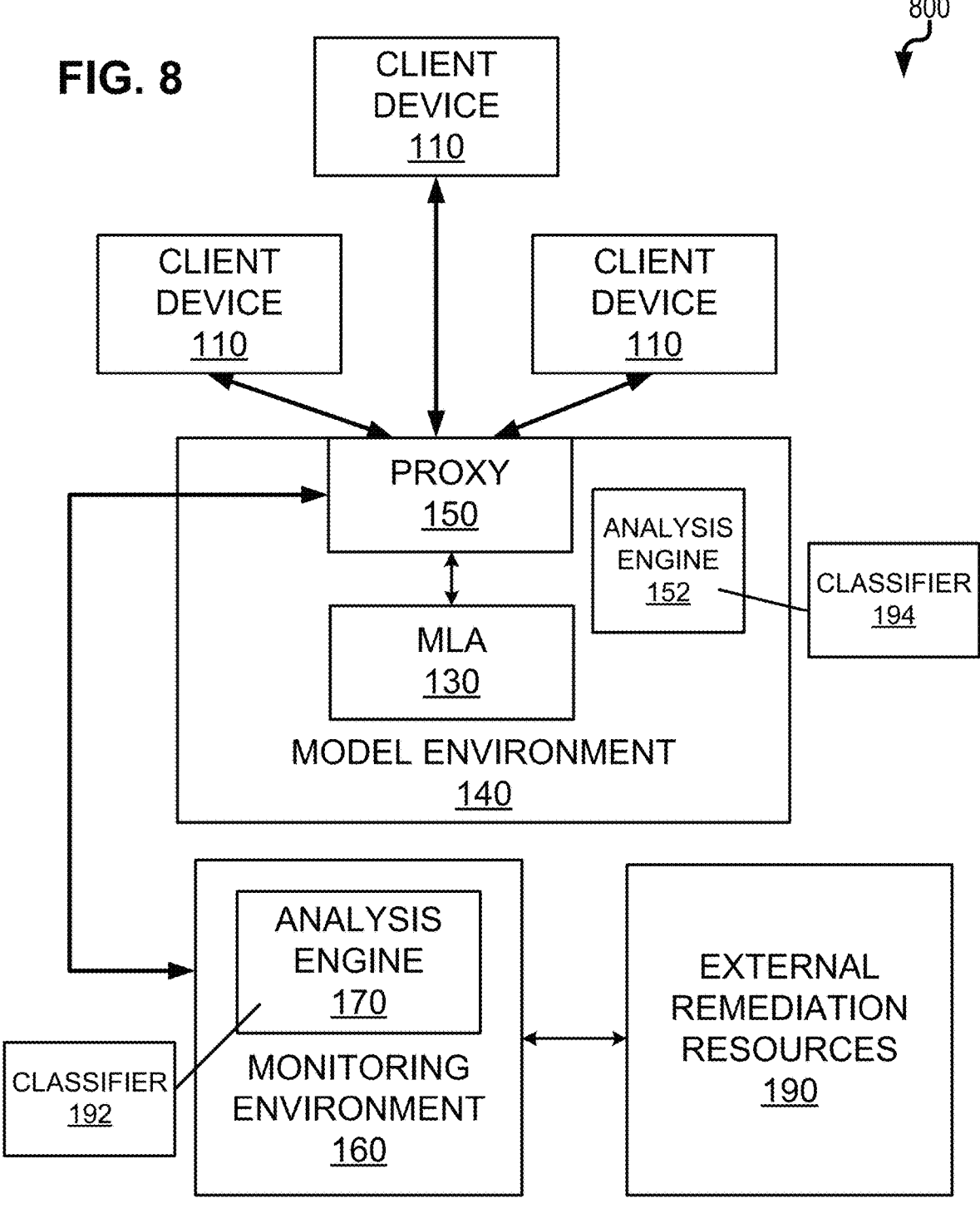
FIG. 8 is a system diagram illustrating a security platform for machine learning model architectures having a model environment having a local analysis engine and a monitoring environment including an analysis engine which interfaces with external remediation resources.

FIG. 8 is a system diagram 800 illustrating a security platform for machine learning model architectures in which the model environment 140 includes a local analysis engine 152 and the monitoring environment 160 includes an analysis engine 170 (but does not include a remediation engine). In this arrangement, analysis can be conducted in the monitoring environment 160 and/or the model environment 140 by the respective analysis engines 152, 170 with remediation actions being triggered or initiated by the external remediation resources 190.

Figure 9:
FIG. 9 is a system diagram illustrating a security platform for machine learning model architectures having a model environment having a local analysis engine and remediation engine.

FIG. 9 is a system diagram 900 illustrating a security platform for machine learning model architectures having a model environment 140 has a local analysis engine 152 and a local remediation engine 154. In this arrangement, the analysis and remediation actions are taken wholly within the model environment (as opposed to a cloud-based approach involving the monitoring environment 160 as provided in other variations).

Figure 10:
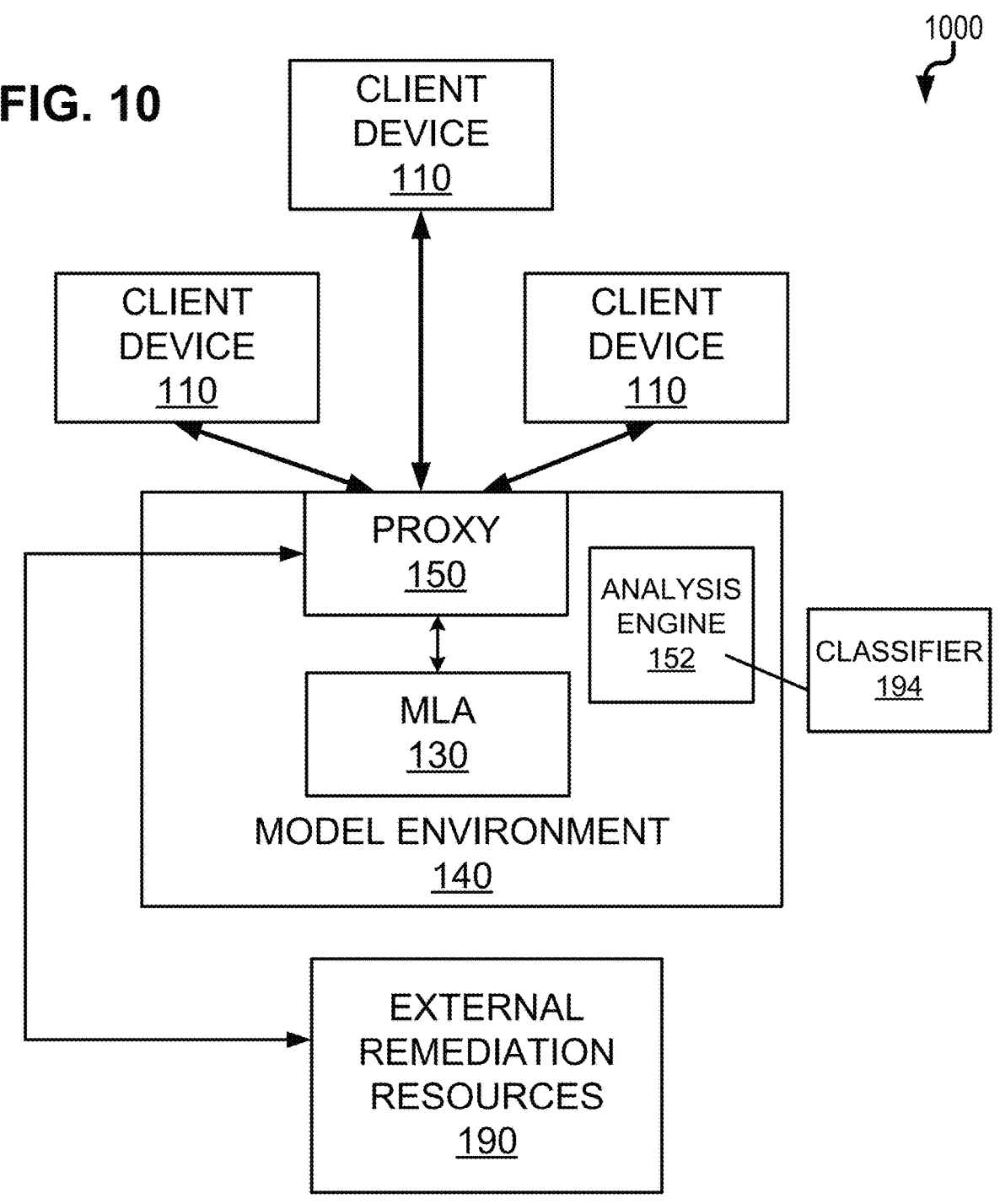
FIG. 10 is a system diagram illustrating a security platform for machine learning model architectures having a model environment having a local analysis engine which interfaces with external remediation resources.

FIG. 10 is a system diagram illustrating a security platform for machine learning model architectures having a model environment 140 including a local analysis engine 152 which interfaces with external remediation resources 190. In this variation, the analysis of inputs/prompts is conducted local within the model environment 140. Actions requiring remediation are then initiated or otherwise triggered by external remediation resources 190 (which may be outside of the monitoring environment 160) such as those described above.

Figure 11:
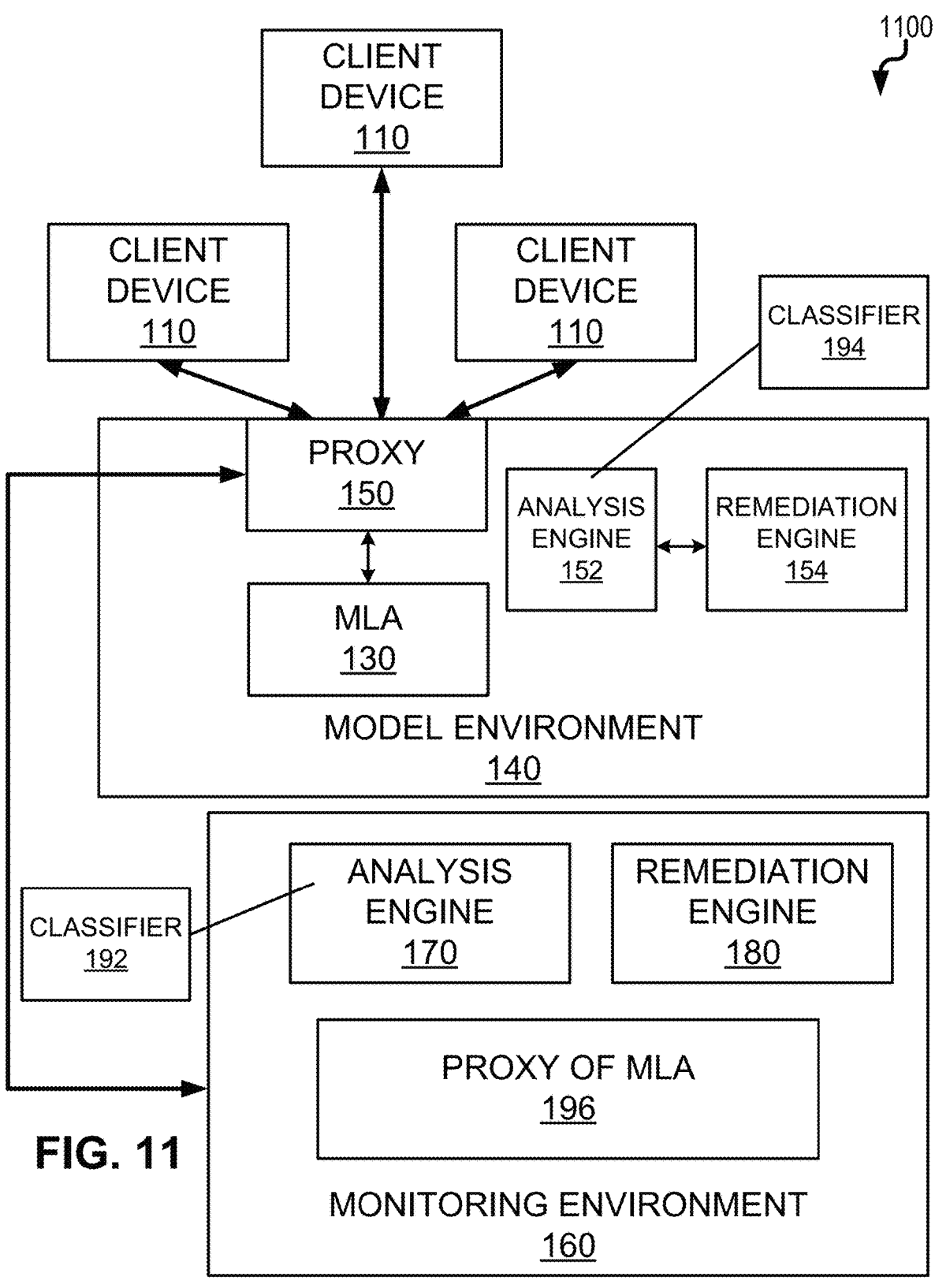
FIG. 11 is a system diagram illustrating a security platform for machine learning model architectures having a model environment which has a proxy of the machine learning architecture.

FIG. 11 is system diagram 11 illustrating a security platform for machine learning model architectures having a configuration in which the model environment includes both a local analysis engine 152 and a local remediation engine 154. The monitoring environment 160, in this variation, can include an analysis engine 170 and a remediation engine 180 as well as a MLA proxy 196 of some or all of the MLA 130. Stated differently, the MLA proxy 196 is a model or series of models that mimic some or all of the behavior of the MLA 130. In this case, the MLA proxy 196 can ingest a prompt and the output and/or an intermediate result of the MLA proxy 196 can be used in connection with a classifier 192. Intermediate result can comprise outputs of some or all of layers (prior to the output layer) or other information generated by the MLA 130 before generating a final output. The analysis engine 170 can make a determination of whether to allow the MLA 130 to ingest the prompt based on an output or intermediate result of the MLA proxy 196.

As indicated above, one or more of the analysis engines 152, 170 can utilize a classifier 192, 194 which can be used to identify whether a prompt is eliciting undesired behavior by the MLA 130. In some cases, the analysis engines 152, 170 are using the classifiers 192, 194 in connection with intermediate results generated by the MLA 130 or MLA proxy 196. The policies used to train the classifiers 192, 194 can map intermediate results to undesired actions/types of actions. In some cases, the policies can specify a type of undesired actions. In such cases, the classifier 192, 194 can be a multi-class classifier which specifies the type of undesired action which can be associated with a particular type of remediation action.

The undesired model behavior can take various forms. For example, a prompt can include instructions which seeks to cause the response to be an unauthorized language. As another example, the undesired behavior can include instructions seeking for the MLA 130 to respond in an unauthorized modality. Modality can, for example, be text, images, video or audio. Stated differently, the MLA 130 may be configured so that it only generates outputs in pre-defined modalities (e.g., text only, text/image only, etc.). A prompt can include instructions to generate or debug computer code; which could be defined by the policy as being a prohibited action. Further, the policy can be used to define that encrypted instructions or instructions to encrypt an output of the MLA 130 can be deemed to be prohibited so that certain remedial actions can be taken.

Language translation tactics can also be used to exploit or otherwise misuse the MLA 130. While LLMs can be used to translate from one language to another, it is often used as a way to bypass safety training of the LLM. By translating from English to an infrequently used language, an attacker can often convince the LLM to bypass its safety training. One or more of the classifiers 192, 194 can be configured to address such an attack.

In some variations, obfuscated payloads can be used to cause the MLA 130 to behave in an undesired manner. For example, in some scenarios, it may be useful for an LLM to be able to see (without explicitly running tools) what is contained in a base64 encoded payload (or any other encoding—base128, xor, convert to hexadecimal, rot13, etc.). However, this approach is another commonly used tactic to hide prompt injections. One or more of the classifiers 192, 194 can be configured to address such an attack.

Code generation and debugging tactics can also be used to exploit the MLA 130. These tactics leverage the fact that LLMs are very effective at providing code completions, and have become widely used in industry. However, this capability has limited value in, for example, a customer service chatbot context. If the LLM happens to eval( ) parts of the prompt (which has been a documented source of exploits on LLM systems as of late), an attacker could get the MLA 130 to generate malicious code to eval( ) without explicitly sending up any code. One or more of the classifiers 192, 194 can be configured to address such an attack.

In order to provide higher control over the MLA 130 the classifiers 192, 194 can comprise guardrail libraries to control what the model is capable of doing. However, in contrast to the conventional techniques which use the native format of a prompt, the current subject matter leverages an intermediate result generated by the MLA 130. In some variations, the neural activations of the MLA 130 can be utilized as such intermediate results contain rich amounts of information. The intermediate results (e.g., activations, etc.) can be used to classify the behavior of the model. The use of intermediate results are also advantageous, in relation to conventional native format-based policies, in that control of model behavior based on intermediate results (e.g., activations, etc.) are more difficult to bypass and require stronger and more computationally demanding white-box attack methods.

For a variety of MLAs 130 with (e.g., open-source LLMs, whitebox models, etc.) classification models (i.e., classifiers) can be precomputed and designed to detect behavioral characteristics based on activation values. These classifiers can then provide a form of behavior controls. For example, if the classification model shows an intermediate result (e.g. activation pattern, etc.) to be associated with complying with language translation, and the customer does not want the chatbot to be capable of translating to other languages, a remedial action can be initiated (e.g., blocking the prompt response and sending an alert to the requesting user, etc.).

In general, the current subject matter can be implemented in a workflow: (1) Policy→(2) MLA→(3) Intermediate Result→(4) Classifier→(5) Response.

Policy: The administrator can determine a policy for all prompts inputted to an MLA 130. As part of this, an example set of prompts that violate and satisfy the policy can be created in order to train the classifier in (4). This policy can relate to various content-detection topics such as "no requests for code generation allowed" or "no requests for translation of phrases into other languages allowed".

MLA: a white-box machine learning model architecture (e.g., LLM, etc.) can be used so that the intermediate result can be extracted from it. While aspects above relate to the MLA 130 comprising an LLM, the MLA 130 can take various forms including other types of state-based text analysis models like long short-term memory models (LSTMs).

Intermediate Result (IR): The IR can be any part of the internal state of the MLA 130 that can be extracted for further analysis. Examples of IR in a transformer-based architecture can include, but are not limited to: activations per layer, self-attention values per layer. The IR can be extracted from the MLA 130 after a prompt has been run through it. The IR itself can be an array of numerical data, or it can be compiled into an array of numerical data, that is then passed to the classifier (4). The array, in some variations, can be a consistent shape (e.g., fixed length, fixed size, etc.) for every prompt run through the MLA 130, regardless of the length or content of the prompt.

In the case of activations: hooks (e.g., Pytorch hooks, etc.) can be applied to every layer of the MLA 130 at the beginning of the analysis. These hooks can reference the activation values of that particular layer. After every prompt is run through the MLA 130, every hook is queried and the activation value for each is stored in a row of a numpy float array. The resulting numpy float array is the IR for the MLA 130 for that prompt (after the values from every hook have been extracted).

Hooks (e.g., Pytorch hooks, etc.) are user-defined functions that get called when a different library function is called during runtime. This arrangement allows the user to "inject" code in the middle of the calculations of a model. In the case of collecting activations, the library function the hook is latched onto is the forward pass of a layer-when the layer makes calculations on an input it is given. The content of the hook is a save of the output of the layer to a row of a global array. This global array is then eventually passed to the classifier (4).

Classifier: The IR is given to a classifier 192, 194, which is trained to determine whether or not the IR violates the policy. The classifier is trained, using supervised learning on the set of IRs generated from the example prompts from (1) as these prompts have been validated as either complying with or violating the applicable policy. The classifier 192, 194, can be respectively executed by analysis engine 170, 152.

Response: The output of (4) determines whether a given prompt satisfies the policy from (1). The remediation engine 154, 180 can opt to take one or more remedial actions when the output does not satisfy the policy. In addition or in the alternative, the administrator can use this response to determine how they would like to take action against the user. Depending on the situation and the type of policy violated, these administrator-driven actions can include: doing nothing, noting the requestor ID of the requesting user for further tracking, and banning the requesting user from submitting further prompts to the MLA 130 and the like.

Figure 12:
FIG. 12 is a process flow diagram illustrating a technique in which an intermediate result of an AI model is used in combination with a classifier trained using a policy-driven training dataset to determine whether a prompt elicits undesired model behavior.
Figure 12:
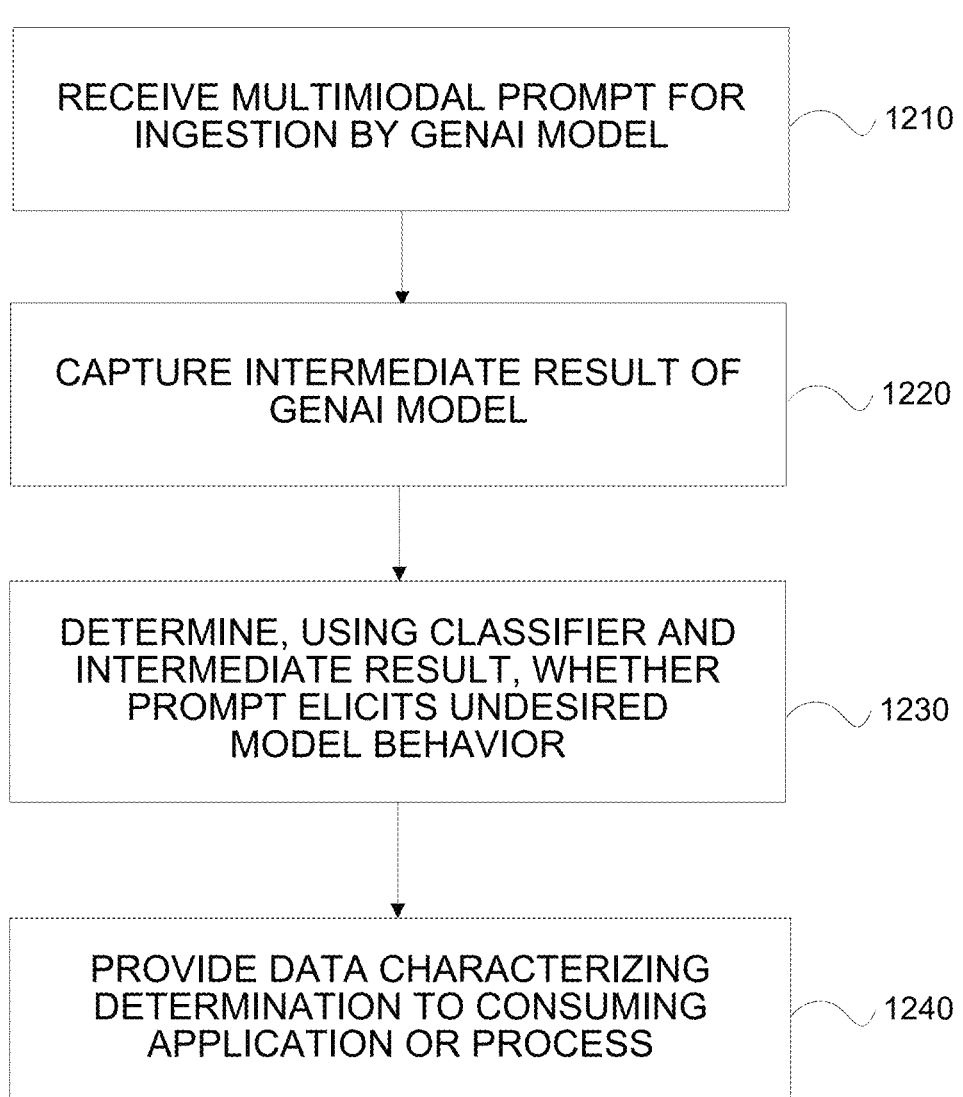

FIG. 12 is a diagram 1200 in which, at 1210, data characterizing a prompt or query for ingestion by an AI model, such as a generative artificial intelligence (GenAI) model (e.g., MLA 130, a large language model, etc.) is received. The prompt can be a multimodal prompt and the GenAI model can be a multimodal model having a pipeline including an encoder and at least one model having a plurality of layers including at least one intermediate layer. The received data can comprise the prompt itself or, in some variations, it can comprise features or other aspects that can be used to analyze the prompt. The received data, in some variations, can be routed from the model environment 140 to the monitoring environment 160 by way of the proxy 150. The multimodal prompt can be encoded or otherwise processed so that it can be ingested by a model (e.g., a model having multiple layers including intermediate layers between an input layer and an output layer) forming part of the pipeline. An intermediate result of the AI model or a proxy of the AI model (which may be in the monitoring environment 160) can, at 1220, be captured. Thereafter, it can be determined, at 1230, using the intermediate result and a classifier, whether the prompt is eliciting the AI model to behave in an undesired manner. This determination can be performed by the analysis engine 152 and/or the analysis engine 170 using a respective classifier 192, 194.

Data which characterizes the determination can then be provided, at 1240, to a consuming application or process. For example, the analysis engine 152 can provide the determination to the remediation engine 154, the analysis engine 170 can provide the determination to the remediation engine 180, the analysis engine 152 can provide the determination to the remediation engine 180, the analysis engine 170 can provide the determination to the external remediation resources 190, the analysis engine 152 can provide the determination to the external remediation resources 190, and/or the determination can be transmitted to or otherwise consumed by a local or remote application or process. The analysis engine 152, 170 in this context can act as a gatekeeper to the GenAI model by sending information to a consuming application or process which results in preventing prompts eliciting undesired behavior from being input and allowing prompts deemed to be safe to be input (in the case of a MLA proxy 196). In some cases, the consuming application or process flags the prompt as eliciting undesired model behavior for quality assurance based on the classifier 192, 194. In some cases, it may be desirable to modify a prompt (which can be performed by the consuming application or process) so that it does not cause the MLA 130 to output an undesirable result. For example, only portions of the prompt may be deemed problematic and such aspects can be deleted or modified prior to ingestion by the GenAI model (in the case of a MLA proxy 196). Other actions can be taken based on the IP address of the requester (such as blocking the prompt, blocking subsequent prompts, modifying subsequent prompts, etc.). Such an arrangement still provides the requestor with an output/response thereby potentially masking the fact that the system identified the response as being problematic (i.e., eliciting undesired model behavior, etc.).

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor (e.g., CPU, GPU, etc.), which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computing device having a display device (e.g., a LED or LCD (liquid crystal display) monitor) for displaying information to the user and a keyboard and an input device (e.g., mouse, trackball, touchpad, touchscreen, etc.) by which the user may provide input to the computing device. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   receiving, from a model computing environment, data characterizing a multimodal prompt for ingestion by a generative artificial intelligence (GenAI) model, the GenAI model comprising a pipeline including an encoder for processing the received data prior to ingestion by a plurality of layers including at least one intermediate layer, the GenAI model further comprising a transformer architecture with residual streams;
   redirecting the multimodal prompt to a quantized proxy of the GenAI model that replicates a layer topology of the GenAI model and is more compact;
   capturing an intermediate result derived from the at least one intermediate layer of the quantized proxy of the GenAI model responsive to the inputting of the received data after it is processed by the encoder, wherein the intermediate result comprises residual-stream activation vectors derived from the at least one intermediate layer of the quantized proxy of the GenAI model via forward-pass hooks applied to the transformer layers;
   determining, based on the intermediate result and using a classifier, whether the prompt seeks to cause the GenAI model to behave in an undesired manner, the classifier being trained using a data set generated using a policy mapping intermediate results to undesired model behavior including a plurality of enumerated prohibited actions; and
   providing data characterizing the determination to a consuming application or process, the consuming application or process:
      preventing the multimodal prompt from being ingested by the GenAI model in response to determining that the prompt elicits undesired actions by the GenAI model; and
      allowing the multimodal prompt to be ingested by the GenAI model in response to determining that the prompt does not elicit undesired actions by the GenAI model.

2. The method of claim 1, wherein the GenAI model comprises a mixture of experts (MoE) model and the intermediate result comprises outputs from at least a subset of experts in the MoE model.

3. The method of claim 1, wherein the consuming application or process flags the prompt based on the determination.

4. The method of claim 1, wherein the consuming application or process blocks an internet protocol (IP) address of a requester of the prompt based on the determination.

5. The method of claim 1, wherein the consuming application or process causes subsequent prompts from an internet protocol (IP) address of a requester of the prompt to be modified based on the determination and causes the modified prompt to be ingested by the GenAI model.

6. The method of claim 1, wherein the consuming application or process prevents the prompt from being input into the GenAI model based on the determination.

7. The method of claim 1, wherein the consuming application or process allows the prompt to be input into the GenAI model based on the determination.

8. The method of claim 1, wherein the consuming application or process modifies the prompt based on the determination and causes the modified prompt to be ingested by the GenAI model.

9. The method of claim 1 further comprising: quantizing the GenAI model prior to capturing the intermediate result.

10. The method of claim 1, wherein a policy maps intermediate results to one or more prohibited actions.

11. The method of claim 10, wherein the one or more prohibited actions include seeking one or more of: a response in a non-approved spoken or written language, computer code, sensitive information, a response to an encrypted prompt, a prompt containing two or modalities, or a prompt in a first modality obfuscating information in a second modality.

12. The method of claim 1, wherein the GenAI model is a state-based text analysis model.

13. The method of claim 12, wherein the state-based text analysis model comprises: a large language model.

14. The method of claim 12, wherein the state-based text analysis model comprises: a long short-term memory model (LSTM).

15. A computer-implemented method comprising:
   receiving data characterizing a multimodal prompt for ingestion by a generative artificial intelligence (GenAI) model, the GenAI model comprising a pipeline including an encoder for processing the received data prior to ingestion by a plurality of layers including at least one intermediate layer;
   capturing, from a quantized proxy of the GenAI model and based on the received data after it is processed by the encoder, an intermediate result derived from the at least one intermediate layer, the quantized proxy of the GenAI model being separate from and more compact than the GenAI model, wherein the intermediate result comprises residual-stream activation vectors derived from the at least one intermediate layer of the quantized proxy of the GenAI model via forward-pass hooks applied to one or more transformer layers;
   determining, using a classifier and based on the intermediate result, whether the prompt elicits undesired actions by the GenAI model, the classifier being trained using a data set generated according to a policy which maps acceptable and undesired actions to intermediate results;

providing data characterizing the determination to a consuming application or process, the consuming application or process:

preventing the multimodal prompt from being ingested by the GenAI model in response to determining that the prompt elicits undesired actions by the GenAI model; and allowing the multimodal prompt to be ingested by the GenAI model in response to determining that the prompt does not elicit undesired actions by the GenAI model.

16. A computer-implemented method for policy-based gating of multimodal prompts in a generative artificial intelligence (GenAI) system, the method comprising:

receiving, by a proxy computing system, data characterizing a multimodal prompt for ingestion by a production GenAI model, the GenAI model comprising a transformer architecture with a plurality of layers including at least one intermediate layer and residual streams;

redirecting the multimodal prompt to a quantized proxy model that shares a layer topology with the production GenAI model, the quantized proxy model configured to process the prompt without generating a final output;

capturing, by the proxy computing system and via forward-pass hooks applied to at least one transformer layer of the quantized proxy model, per-token activation vectors from residual streams at a predetermined intermediate layer, wherein the capturing occurs after encoding of the prompt and before any output is generated by the production GenAI model;

applying, by the proxy computing system, a classifier trained using a policy-labeled dataset that maps internal activation patterns to a plurality of enumerated prohibited actions, the prohibited actions comprising at least: (i) generation of computer code, (ii) response in a non-approved language, (iii) response to an encrypted prompt, or (iv) cross-modal obfuscation;

determining, by the proxy computing system and based on the per-token activation vectors, whether the prompt is likely to elicit a prohibited action by the production GenAI model; and in response to the determination, gating the prompt by preventing the prompt from being ingested by the production GenAI model when the determination indicates a prohibited action, and allowing ingestion otherwise, such that the production GenAI model does not process prompts likely to elicit prohibited actions.

17. A system comprising:

at least one data processor; and memory storing instructions which, when executed by the at least one data processor, result in operations comprising:

receiving, from a model computing environment, data characterizing a multimodal prompt for ingestion by a generative artificial intelligence (GenAI) model, the GenAI model comprising a pipeline including an encoder for processing the received data prior to ingestion by a plurality of layers including at least one intermediate layer, the GenAI model further comprising a transformer architecture with residual streams;

redirecting the multimodal prompt to a quantized proxy of the GenAI model that replicates a layer topology of the GenAI model and is more compact;

capturing an intermediate result derived from the at least one intermediate layer of the quantized proxy of the GenAI model responsive to the inputting of the received data after it is processed by the encoder, wherein the intermediate result comprises residual-stream activation vectors derived from the at least one intermediate layer of the quantized proxy of the GenAI model via forward-pass hooks applied to the transformer layers;

determining, based on the intermediate result and using a classifier, whether the prompt seeks to cause the GenAI model to behave in an undesired manner, the classifier being trained using a data set generated using a policy mapping intermediate results to undesired model behavior including a plurality of enumerated prohibited actions; and providing data characterizing the determination to a consuming application or process, the consuming application or process:

preventing the multimodal prompt from being ingested by the GenAI model in response to determining that the prompt elicits undesired actions by the GenAI model; and allowing the multimodal prompt to be ingested by the GenAI model in response to determining that the prompt does not elicit undesired actions by the GenAI model.

* * * * *